United States Patent [19]

Laymon

[11] Patent Number: 4,523,076
[45] Date of Patent: Jun. 11, 1985

[54] AUTOMATIC WELDING MACHINE WHICH PROVIDES UNIFORM WELDING OF A WORKPIECE DURING VERTICAL MOVEMENT THEREOF

[75] Inventor: Charles R. Laymon, Loveland, Ohio

[73] Assignee: Welco Industries, Inc., Cincinnati, Ohio

[21] Appl. No.: 477,063

[22] Filed: Mar. 21, 1983

[51] Int. Cl.³ .............................................. B23K 9/12
[52] U.S. Cl. ................................ 219/125.1; 219/60 R; 219/126; 228/45
[58] Field of Search ............. 219/125.1, 125.11, 60 R, 219/61, 126; 228/45

[56] References Cited

U.S. PATENT DOCUMENTS 3,068,351  12/1962  Longenecker et al. .......... 219/125.1
3,196,248   7/1965  Cooper et al. .................. 219/125.11
3,255,336   6/1966  Purcell ............................ 219/125.11
3,897,898   8/1975  Hirose et al. ..................... 219/125.1
4,014,495   3/1977  Oda et al. ......................... 219/125.1

Primary Examiner—Clifford C. Shaw
Attorney, Agent, or Firm—Kinney and Schenk

[57] ABSTRACT

An automatic welding machine for arc-welding stator core laminations is disclosed. The machine carries singular or plural workpieces which are fixtured on a vertical slideway. A slide moves past relatively stationary welding guns which are independently adjusted and independently activated for the weld process. The workpieces may be indexed for desired weld spacing. In one embodiment the indexing may be manual or power actuated. In another embodiment the guns may be varied as to radial position as the workpiece is moved, to weld non-constant cross-sectioned parts.

13 Claims, 13 Drawing Figures

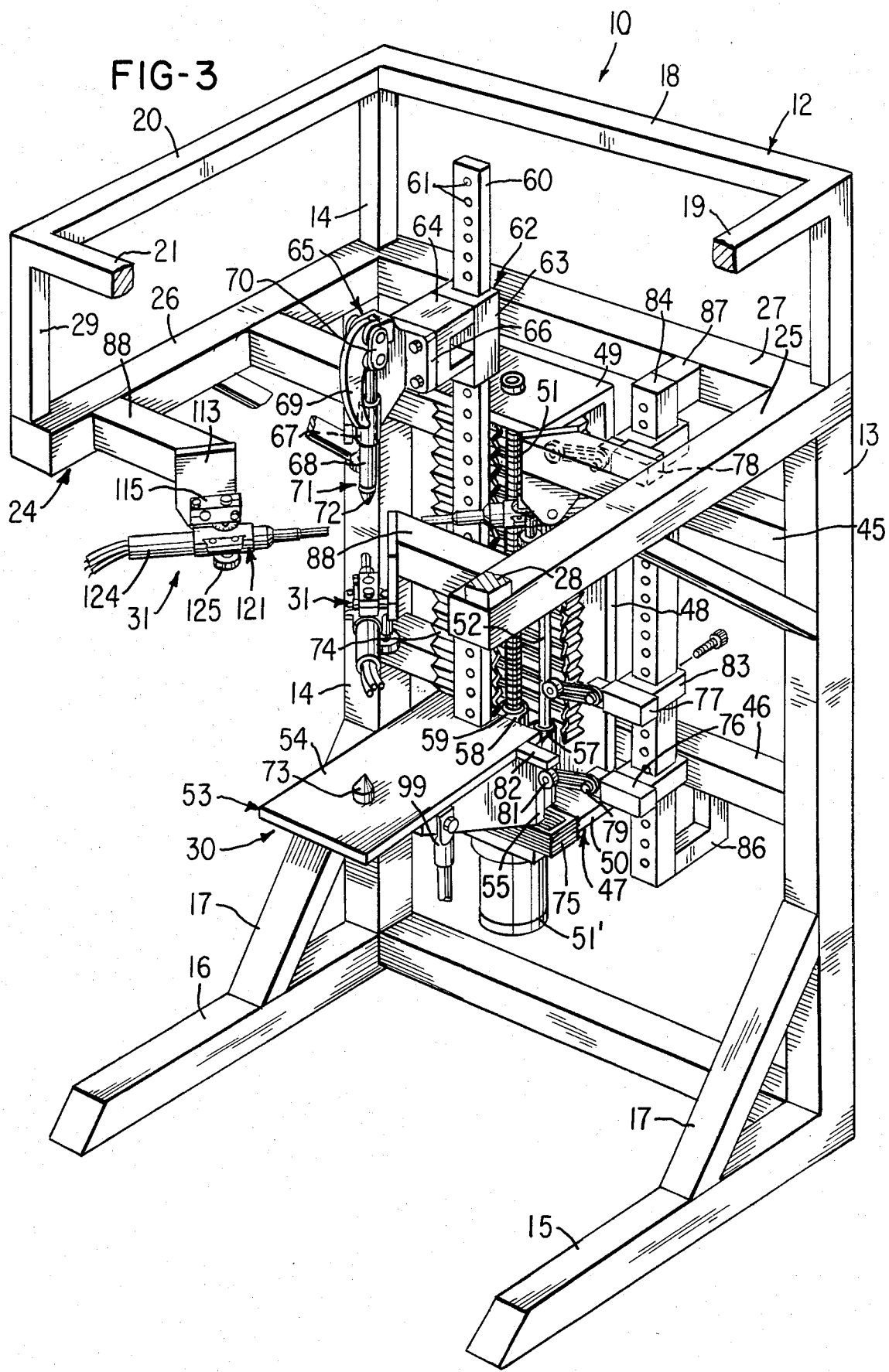

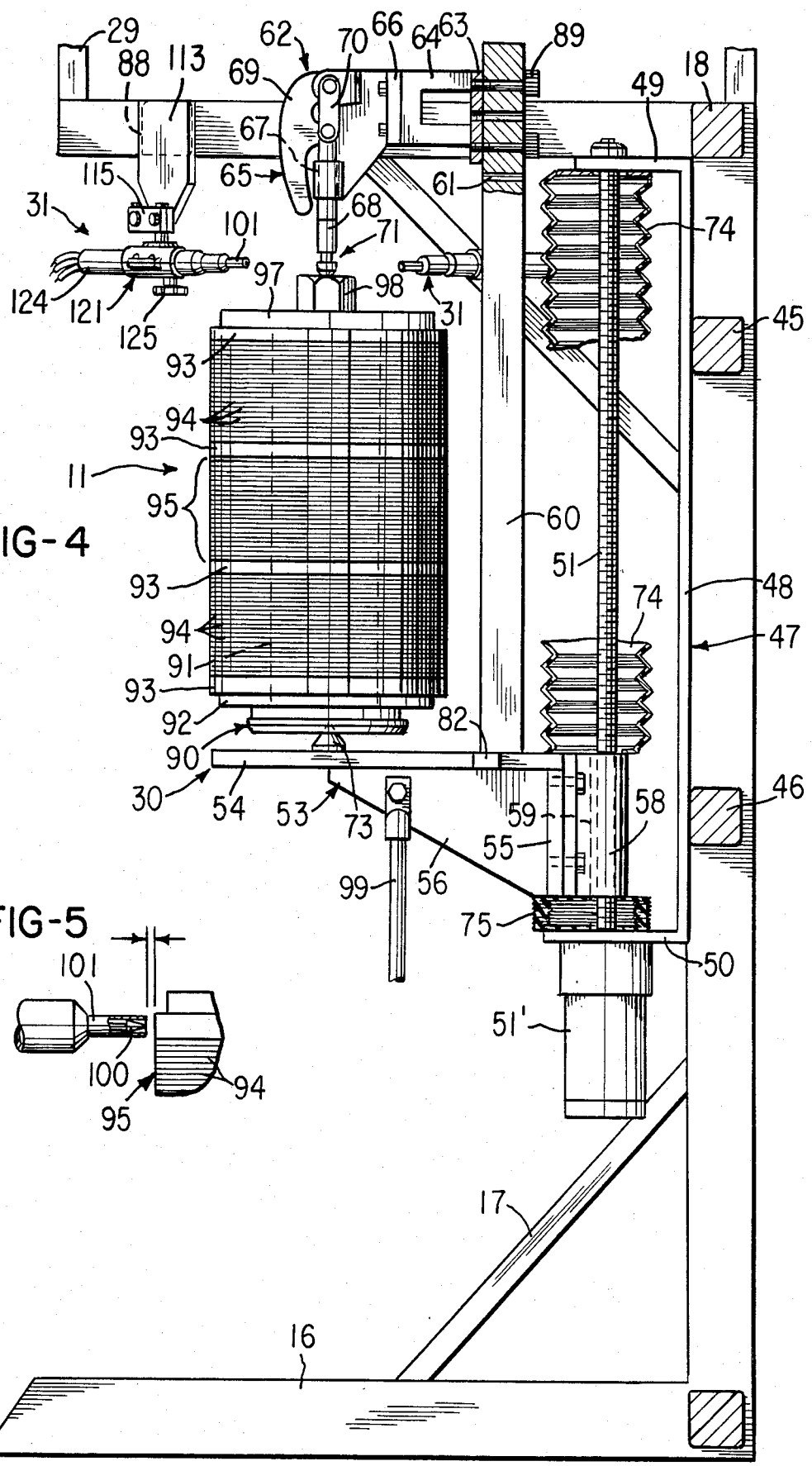

1

AUTOMATIC WELDING MACHINE WHICH PROVIDES UNIFORM WELDING OF A WORKPIECE DURING VERTICAL MOVEMENT THEREOF

BACKGROUND OF THE INVENTION

The invention relates to generally welding machines for joining the laminations of a stack of stator cores to form a unitary assembly, and particularly to arc welding type machines.

Several prior art patents have been found to be of interest in reviewing machines in the arc welding field.

U.S. Pat. No. 4,114,019, of Sandor, Sept. 12, 1978, discloses a machine which utilizes a moving welding head which is moved relative to laminations of core-plated silicon steel. The essence of the invention is that operating current is limited to about 170 amps, and the arc welding microwire is held to a diameter of no greater than 0.050 inches, so that a weld bead which remains in molten form for only a few seconds will not trap the gaseous portions of the melted core plate and result in a porous weld.

U.S. Pat. No. 4,056,705, of Linam et al, Nov. 1, 1977, discloses a welding machine structure, wherein a plurality of welding torches are carried on a horizontal overhead beam, and a plurality of generally cylindrical workpieces are moved horizontally beneath the welding torches. The gist of the invention is to control the speed of the horizontal movement and to use scanner means on the welding guns to sequentially activate and deactivate the weld guns.

U.S. Pat. No. 4,229,642, of Sakurai et al, Oct. 21, 1980, discloses a large scale welding machine having a frame-supported, horizontally movable, truck which carries a horizontal workpiece on its central axis, and the truck is fixedly positioned, i.e., grossly positioned to descrete predetermined work stations along the track to get within welding range of the welding head. The welding head is carried on a short horizontal slide and is capable of performing a horizontal bead of weld on the workpiece.

U.S. Pat. No. 4,129,771, of Pinettes et al, Dec. 12, 1978, discloses a method for butt welding cylindrical metal rods, wherein a plurality of rods are vertically positioned above one another and butted end-to-end. A pair of rods to be welded are held between work tongs or chucks, and a welding torch is carried midway between the workholding tongs. The workpieces are rotated and a butt weld is formed at the juncture of the workpiece ends. After forming a butt weld, the workpieces are vertically moved to present the next butt ends to the welding torch. Thus, vertical movement is merely sequential to move the ends of the workpiece to the torch station following a weld operation.

U.S. Pat. 1,453,026, of Smith, Apr. 24, 1923, discloses a single electrode machine of the conventional arc welding type, which mounts the welding electrode vertically above the workpiece. The workpiece may be rotated to form a circular girth weld, or the workpiece may be (generally) longitudinally moved in front of the vertical electrode to weld a curvilinear shape on the workpiece.

The prior art machines which utilize a moving head-especially of the heliarc welding type, wherein an inert gas must be supplied to the welding zone to prevent oxidation of the weld-generally have certain drawbacks. The hoses, which supply the gas, and the wire feed spool, which feeds a wire-type electrode through the center of a welding gun, are difficult to move without causing wear on the flexing members and/or interfering with machine slide movements.

The machines which utilize horizontally-held workpieces moving beneath a vertical welding head, generally have the following drawbacks: (a) the workpiece carrying slide can become prohibitively long, thus taking up large floor space at the machine site; (b) the only effective weld which can be laid down on the workpiece is the weld on top of the work because it is very difficult to weld from underneath the workpiece and maintain the bead form. Thus, such machines are generally restricted to effectively using only one welding head.

Applicant has determined that the most effective type of machine for consistent quality control of weld, and for ease of machine movements and maintenance of welding head components, is that of a structure which supports the workpiece in a vertical attitude and moves the workpiece past a stationary heliarc welding head. A plurality of welding heads may be positioned radially around a workpiece and the welding heads may thereby simultaneous weld beads of identical quality.

Applicant's inventive structure has therefore obviated the difficulties inherent in the prior art devices.

SUMMARY OF THE INVENTION

The invention is shown embodied in an automatic welding machine, which utilizes a base frame having a vertical slideway thereon. A work slide is movably carried on the vertical slideway and is powered in a vertical manner by a motor and ball screw combination. The workslide has a headstock centering device at the one end which is a conical machine center with a vertical cone axis, and a footstock portion, having a similar machine center, is carried at the opposite end of the slide. The centers are adjustably positioned with respect to one another along an adjustment bar, to accomodate varying workpiece mandrels. The workpiece is comprised generally of a stack of laminations which are to be welded to form a stator core. The stator core laminations may be stacked in spaced groups along a workpiece mandrel for commonality of workpiece holding during the welding process. The inventive workpiece machine further includes at least one welding head which is carried in a bracket on the machine frame, and the welding head is adjustably positioned on the bracket and locked in position. The welding head is adjusted to maintain a fixed gap from a vertically movable workpiece surface during the workpiece excursion through the welding zone. A plurality of welding heads may be usefully employed, to create plural welds, and the workpiece may be manually rotatably indexed for multiple groups of weld beads. The machine slide is automatically driven along its vertical linear path and switching means is provided to signal the start and stop points of weld application.

It is an object of the present invention to provide a machine structure which utilizes vertical travel of a workpiece for quality application of plural welds on a workpiece.

It is a further object of the present invention to provide for stationary weld heads on the machine to create a simpler machine structure by obviating difficulties with heliarc weld hoses and electrodes and maintenance thereof.

It is still a further object of the present invention to provide a machine structure which is readily accessible by a machine operator, for inserting and removing workpieces at the workholding site.

BRIEF DESCRIPTION OF THE DRAWINGS

FIG. 3 is a perspective view in partial broken-away section illustrating basic machine structure and having the workpiece removed for clarity.

FIG. 4 is a right side elevational section taken through the machine workholding slide and drive screw assembly.

FIG. 5 is an enlarged view of a welding tip in relation to a workpiece.

DESCRIPTION OF THE PREFERRED EMBODIMENT

Figure 1:
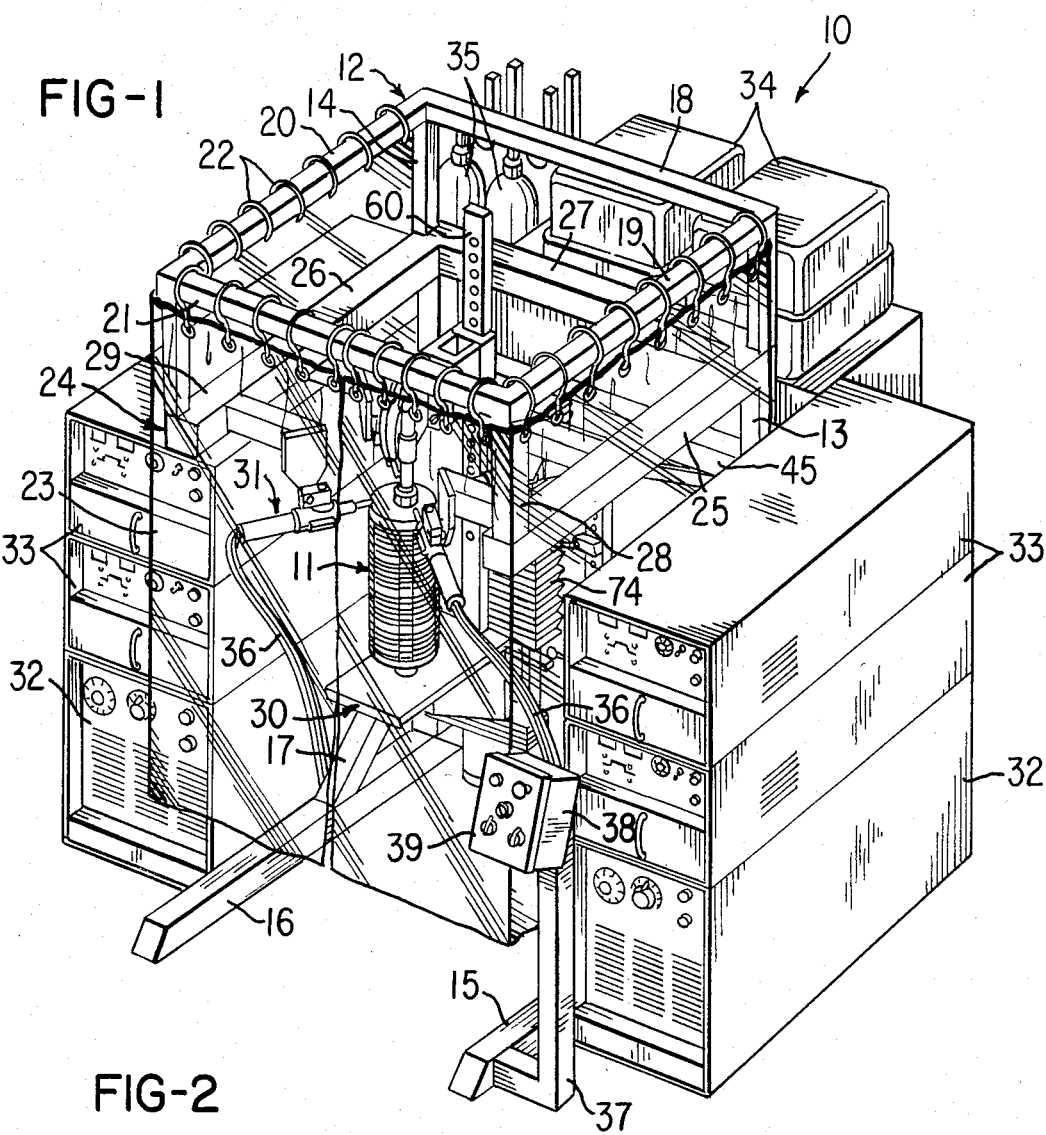
FIG. 1 is a perspective view of an automatic welding machine.

Referring to the drawings and particularly to FIG. 1 thereof, there is shown an overall perspective view of an automatic welding machine 10 for welding stator core assemblies or workpiece 11 and the like. The machine 10 has a base frame 12 manufactured from 5 tubular steel of square cross-section, and the frame 12 is of a generally open construction, that is, having no side or back plates confining the interior of the structure. The frame 12 has a pair of spaced-apart vertical column members 13, 14, at its rear corners, from which depend the rest of the machine 10. The upright members 13, 14, are welded to a pair of horizontal foot members 15, 16, and braced therebetween with gussets 17, to maintain squareness of the two. The topmost end of the vertical members 13, 14, have a square tubular frame welded thereto, which consists of a back member 18, two side members 19, 20, and a front cross bar 21 all lying horizontally and welded together. The side members 19,20 and front bar 21 are fitted with curtain rings 22, and shielding curtains 23 are hung from the rings 22 to prevent weld spatter and excess arc lighting to escape from the interior of the structure.

In the embodiment shown, the welding curtain 23 is plastic, and gold-colored, to deflect and defuse rays, but it may be appreciated that other colors of curtains may be employed to filter certain visible and invisible rays, and various thicknesses and layers of curtains may be employed as well. The colored welding curtain 23 employed is transparent, to permit visual inspection of the interior of the machine 10 during the welding process, but it may be appreciated that opaque curtains may be employed if desired.

At a point spaced below the topmost end of the vertical members 13, 14, a welding support structure 24 is fabricated, comprising a three-sided or U-shaped element lying horizontally on its side, wherein two legs 25, 26 of the U-shaped member extend along the sides of the base frame 12 from the vertical members 13, 14, and the tying member 27 extends along the back of the unit between the members 13, 14. A pair of short vertical members 28, 29, are fabricated at the frontmost corners of the welding support assembly 24 and the entire unit is welded to form a unitary base frame 12. The rearmost interior portion of the base frame 12 supports a vertically movable machine or work slide assembly 30 which will be described further in conjunction with FIG. 3. The welding support structure 24 carries heliarc welding torches, or welding heads or guns 31, which will be described further in conjuction with FIGS. 3 and 4.

Actual machine power for welding is obtained from commercial units which are stacked in layers at the sides of the machine. The power source 32 for the welder forms a base unit and is available from the Miller Corporation. Tig-Rig (TM) control units 33 are situated on top of the power source 32, and likewise are available from the Miller Corporation. Water coolers 34 are located at the rear of the machine 10 and are available from the Bernard Corporation. At the left rear corner of the machine are located a plurality of gas tanks 35, which are filled with inert gas such as argon, which will provide an inert gaseous atmosphere at the welding zone to prevent oxidation and ruination of the weld. The Tig-Rig controls 33 send electric power through a tungsten electrode (not shown) centrally carried within the welding gun 31, and the tanks 35 supply argon gas through hoses 36 connected to the gun 31 as well. Here it should be noted that the welding guns 31 are stationary with respect to the machine base frame 12, thus simplifying the handling and maintenance of the welding hoses 36 and the electrodes. Accordingly, each welding head 31 is supported at a fixed vertical position along said slideway and each welding head 31 has means for welding the workpiece 30. The lower right front portion of the base frame has an L-shaped member 37 fabricated thereto, and the top of the member 37 carries an electrical box 38 having a control panel 39 as its cover. The control panel 39 serves to permit the operator to control the machine functions.

Figure 2:
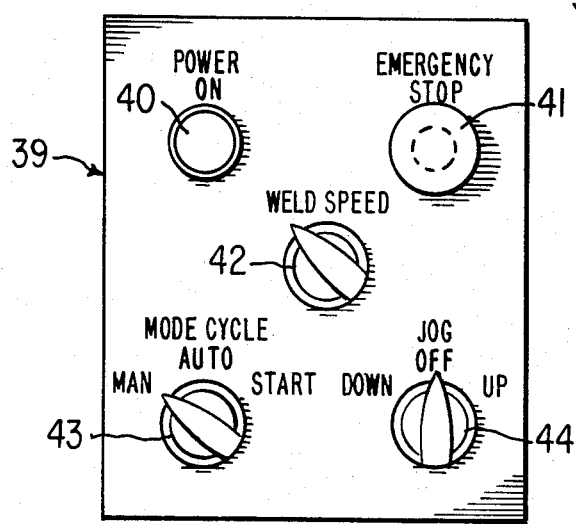
FIG. 2 is an enlarged view of the machine control panel of FIG. 1.

FIG. 2 illustrates the machine control panel 39, wherein a POWER ON button 40 is depressed to provide to turn the main power on to the machine 10. An EMERGENCY STOP red mushroom palm button 41 is provided, which may be easily struck to shut down all machine power. A WELD SPEED CONTROL switch 42 is a rotary potentiometer which is infinitely adjustable to set the weld speed rate, which is the traverse rate of the workpiece 11 past the stationary weld guns 31. The MODE CYCLE switch 43 is a multifunction switch having three positions: MANUAL; AUTO; and START. In the MANUAL postion, the operator uses the "JOG" selector switch 44 for controlling the directional movement of the machine slide assembly 30 during the set-up of the machine 10. When the MODE CYCLE selector switch 43 is turned to the MANUAL position, the JOG switch 44 may be turned to either UP or DOWN, to drive the machine slide assembly 30 along its vertical path. When the MODE CYCLE switch 43 is set to AUTO, the machine 10 will run in automatic operation after start of the cycle is initiated.

To initate the automatic cycle, the gas from the tanks 35 is turned on from an independent valve (not shown): the MODE CYCLE selector switch 43 is turned to the START position and the machine slide assembly 30 starts upward in its travel. Release of the MODE CYCLE switch 43 causes the switch to spring-return to AUTO, and the slide assembly 30 will continue upward until a limit switch is struck, initiating firing of the weld guns 31, and upward travel will continue at a controlled weld speed until an end-of-position switch is struck, at which time the weld guns 31 will be turned off and reversal of the machine slide assembly 30 will occur, causing the assembly 30 to move downward until a lowermost load-unload position switch is actuated. At such time, the machine cycle is complete and the operator may thereby remove the finished part and insert an unfinished part to be welded. The limit switches mentioned will be discussed further in connection with FIG. 3.

Turning to FIG. 3, the welding machine is depicted with the workpiece assembly removed, showing only the structural elements. The vertical members 13, 14, at the rear corners of the base frame 12 are provided with horizontal cross bars 45, 46 carrying a drive screw bracket 47. The bracket 47 is generally formed from a main base plate 48 vertically spanning and attached to, the cross bars 45, 46, and a pair of integral end plates 49, 50, extend at 90° to the base plate 48. The end plates 49, 50, have a ball screw 51 journalled therebetween for rotation, and the ball screw 51 is restrained from axial movement. The bottom end plate 50 has a drive motor 51' secured thereto which, in this case, is an electrically driven gear motor. The brackets carry a pair of vertical slide bars 52, which are hardened and ground to a precision size and are fitted into the end plates 49, 50, at fixed, parallel, positions straddling the ball screw 51. The machine slide assembly 30 is comprised of a footstock 53 having a horizontal plate 54 or table portion, and a vertical bracket 55 secured to the plate 54. The bracket 55 is reinforced with a gusset plate 56 to maintain squareness between the horizontal and vertical members 54, 55. The vertical bracket 55 is secured to a pair of recirculating ball bushings 57 which have ball bearings therein and are available commercially from the Thompson Company and the ball bushings 57 and ball bearings thereby provide an antifriction means when fitted to the slide bars 52, by virtue of the recirculating bearing ball paths within the ball bushings 57. Thus, the bracket 55 and hence the work slide assembly 30 is supported in a cantilevered manner by the vertical slideway or slide bars 52 for vertical movement therealong, with the work slide assembly 30 having a mounting axis for the workpiece 11 disposed parallel to and spaced from said slideway for easy access thereto. Midspan between the spaced-apart ball bushings 57, the vertical member 55 is secured to a housing 58 carrying a ball nut 59, which is free to move in a vertical direction along the ball screw 51. The ball nut 59 and screw 51 are commercially available from Saginaw Ball Screw Company and contain recirculating ball elements, to provide an antifriction screw drive. Here it should be noted that other, frictional type screws might be employed, but the antifriction screws give a smooth feed and thus a very uniform weld bead or weld bead means, not probable with a jerky, rough, feed. A vertical adjusting bar 60 extends from the horizontal footstock plate 54, and the adjusting bar 60 is fitted with a plurality of horizontally-drilled holes 61 at equally spaced intervals. A headstock 62 is slidable to adjusted positions along the vertical adjusting bar 60, and may be locked in discrete locations by screws 89 to accommodate a wide range of workpiece mandrels (see FIG. 4). The headstock 62 has a U-shaped channel 63 which is slidable along the vertical adjusting bar 60 and a spacer block 64 is bolted to the U-channel 63. The spacer block 64 carries a clamping unit 65, available from the DeStaco Company, and the clamping unit 65 is an over-the-center toggle-action plunger clamp. The base bracket 66 of the clamp has a bore 67 which carries a slidable plunger 68 therein, and the plunger 68 may be retracted in the bore 67 by lifting a handle 69 which pulls through a linkage 70, thereby retracting the plunger 68. When clamping, the handle 69 is swung to the down position (shown), and the toggle linkage 70 forces the plunger 68 down in the bore 67. The plunger 68 of the clamp unit 65 carries a machine center 71 which will be described further in conjunction with FIG. 8. The machine center 71 is provided with a conical tip 72 pointing downward. An opposing machine center 73 is located on the footstock horizontal plate 54 in direct opposition to the conical tip 72 of the headstock 62. The footstock center 73 is likewise provided with a conical tip for holding a work mandrel. The machine centers 71 and 73 and their conical tips define the previously mentioned mounting axis of the slide assembly 30. A pair of extensible bellows 74, 75, surround the ball screw 51 and slide bars 52 and are located between the footstock 53 and the end plates 49, 50 of the drive screw bracket 47 to prevent contaminents from entering the antifriction elements.

Three limit switches 76, 77, 78, are provided in spaced vertical relation above one another at the right side of the machine slide assembly 30. The switches are roller type limit switches, that is, having internal contacts which may be either normally open or closed, and a rotary pin 79 serves to actuate the switch contacts. The rotary pin 79 of the switch has a lever arm 80 mounted thereto with a roller 81 at the outermost end. The rollers 81 of the limit switches are contacted by a trip dog 82 which extends from the side of the footstock 53. The switch bodies are secured to U-shaped limit switch adjusting blocks 83 which are carried on a vertical limit switch rail 84. The rail 84 is provided with a plurality of vertically spaced apart holes 85 so that the switches 76, 77, 78, may be positioned to desired levels, and fine positioning of the switch contact points relative to the machine slide assembly 30 is accomplished by slight rotary adjustment of the lever arm 80 which may be loosened and reconnected to the pin 79 of the switch. The switch-carrying rail 84 is secured to stand-offs 86, 87, welded to the horizontal cross bars 27, 46, of the base frame 12.

The machine 10 is provided with four welding guns 31, which are horizontally opposed to one another on a horizontal plane in a coordinate, X-shaped pattern. The frontmost guns 31 are angularly located in the plan view at 45° to the frontmost, operator, position. A plurality of standoffs 88 are provided on the welding support structure 24 to carry the welding guns 31.

The vertical elevational section of FIG. 4 shows the base frame 12 supporting the drive screw bracket 47, and the ball screw 51 is shown within its protective bellows 74, 75. The drive motor 52 extends from the bottom end plate 50 of the bracket 47. The ball nut 59 is carried within the nut housing 58 bolted to the vertical plate 55 of the footstock 53. The horizontal plate 54 of the footstock 53 carries the adjusting bar 60 and the headstock 62 is secured to the bar 60 by a pair of knurled-head screws 89 which may be loosened and retightened as the headstock 62 is re-positioned. The footstock center 73 and headstock center 71 are shown inserted in the conical bores of a work support mandrel 90. The work support mandrel 90 has a generally cylindrical body 91 (see FIG. 6) and a circular flange 92. The circular flange 92 supports a copper disc 93 and a vertical stack of steel stator laminations 94. A predetermined number of laminations 94 form one stator core 95, and additional copper discs 93 and alternating stator core stacks may be located on the mandrel 90. The topmost end of the mandrel 90 is formed with a threaded stud 96 (see FIG. 6) and a clamping washer 97 is located on the stud 96 and held with a nut 98 to clamp the workpiece assemblies together in unison with the work support mandrel 90. A grounding clamp 99 is secured to the footstock 53 and connected to the control unit to complete the arc welding electrical circuit.

FIG. 5 is a close-up view of a tungsten welding electrode 100 carried within the gas supply barrel 101', or torch, of the welding gun 31, and the tungsten tip 11 is sharpened to a point. The point is maintained at a fixed gage dimension (approximately 1/16 inch) from the surface of the workpiece 95 to maintain an accurate arc during the welding process. The arc fuses the laminations 94 of the stator core 95 together by burning the material into inself under a continuous melt. The machine will produce up to four welds simultaneously, or as many welds as guns can be mounted. A typical weld may be 3/16" wide and 0.010"–0.105" deep for cores 95 of thin cross section.

Figure 6:
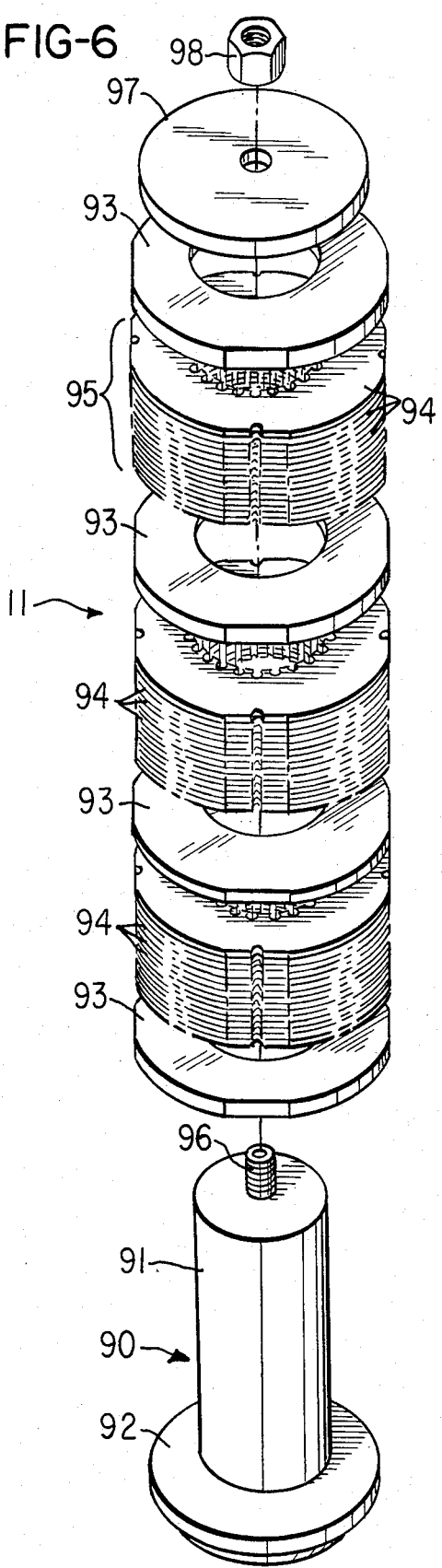
FIG. 6 is an exploded perspective view of a plurality of workpiece stacks and workholding mandrel.

FIG. 6 illustrates, in perspective, the workpiece support mandrel 90 having its flange 92 and main body diameter 91 for receiving the respective pluralities of workpiece laminations 94 and the copper discs 93 which serve to space the respective stator core laminations 94. The end washer 97 and clamping nut 98 are shown to be threadably received on the mandrel stud 96.

Figure 7:
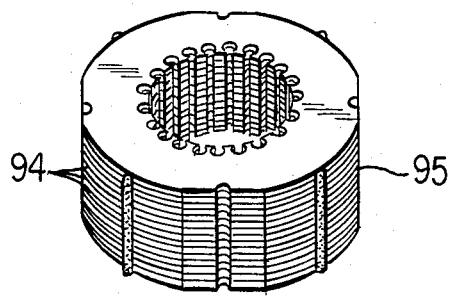
FIG. 7 is a perspective view of a finished workpiece.

FIG. 7 depicts a finished stator core assembly 95, wherein a plurality of lamination elements 94 are punched from thin sheets of electrical steel (generally some high silicon content iron sheeting), and uniform weld bead means or beads have been formed along the periphery of the laminations 94 to fuse the assembly together into a unitary core 95.

Figure 8:
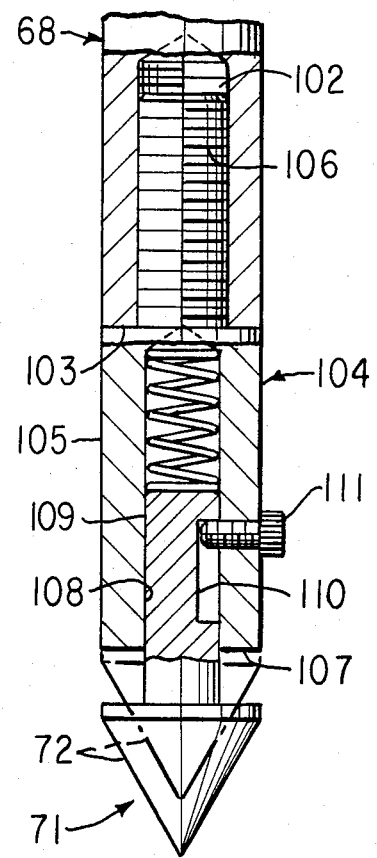
FIG. 8 is a right side elevational section through the headstock clamping center.

FIG. 8 depicts the machine center of the headstock plunger 68. The plunger 68 is shown having a threaded hole 102 in its end face 103. A center adapter 104 has a main diameter 105 extending from the plunger face 103 and a threaded stud 106 extends from the main diameter 105 and is threadably received within the hole 102 of the plunger 68. The outermost end 107 of the center adapter 104 is provided with a central bore 108 into which is received a close fitting pilot diameter 109 of a conical centering tip 72. The pilot diameter 109 has a key slot 110 machined therein, and a knurled-head set screw 111 is threadably received transversely through the center adapter 104, extending into the key slot 110 of the pilot diameter 109. A very stiff backup spring 112, having a preload in the range of 600 pounds, is received in the bore 108 of the center adapter 104, and serves to bias the center tip 72 to an extreme downward position. The extreme stiffness of the spring 112 causes the headstock center assembly to be essentially a rigid unit, yet some compliance of the center tip 72 is permissible when the tip 72 is thrust down into mandrels 90 of slightly varying length. Thus, differing mandrels 90 can still be clamped tightly because of the compliance of the center tip 72.

Figure 9:
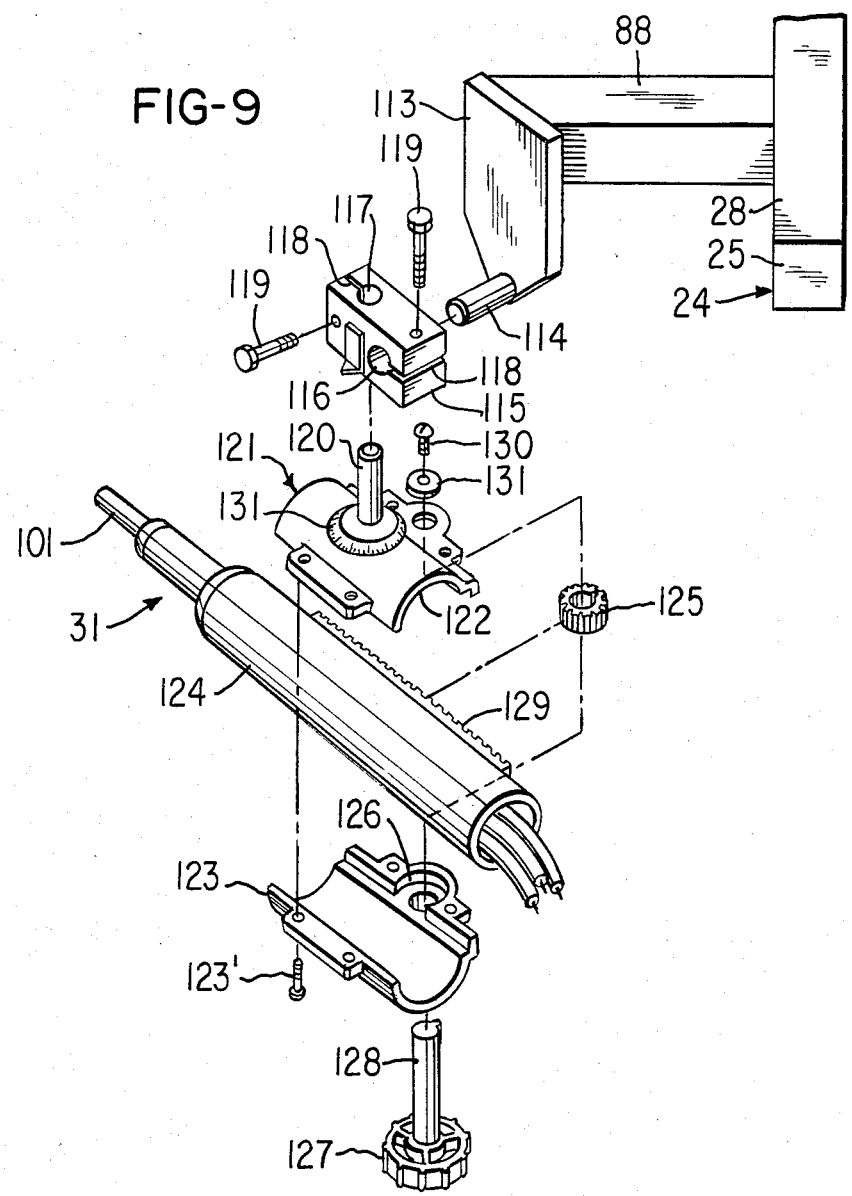
FIG. 9 is an exploded perspective view of a welding torch mounting assembly.

The perspective view of FIG. 9 illustrates the universal "gimbal-type" mounting provided for holding the welding guns 31. The base frame weld support member 24 is provided with a standoff 88 which is angled and carries a vertical support plate 113. The support plate 113 has a horizontal pin 114 onto which is received an adapter block 115. The adapter block 115 has a horizontal hole 116 and a vertical hole 117 therethrough and saw slots 118 and clamping screws 119 are provided to secure the block 115 in position. The vertical hole 117 through the adapter block 115 receives the vertical pin 120 of a welding gun body 121. The welding gun body is comprised of two semicircular housing parts 122, 123, which are clamped together by screws 123' around the main barrel diameter 124 of the welding gun torch 101. The semicircular housing parts 122, 123 of the welding gun body 121 have a manually rotatable gear 125 located therewithin a bore 126, and adjusting knob 127 is attached to a rod 128 which is keyed into the gear 125. The gear 125 is in mesh with a linear rack 129 located on the welding gun torch barrel 124. Thus, when the gun assembly 31 is clamped together, the knob 127 may be rotated manually to advance retract the welding gun torch 101 in the direction of the double-ended arrow to facilitate set-up of the guns 31 and maintain the arc gap. The adjusting knob 127 and rod 128 are held into engagement with the entrapped gear 125 by a screw 130 and washer 131 provided through the topmost end of the semicircular housing part 122. A graduated scale 131 is provided around the support pin 120 so that angular positioning of the welding torch barrel 124 may be easily facilitated.

Figure 10:
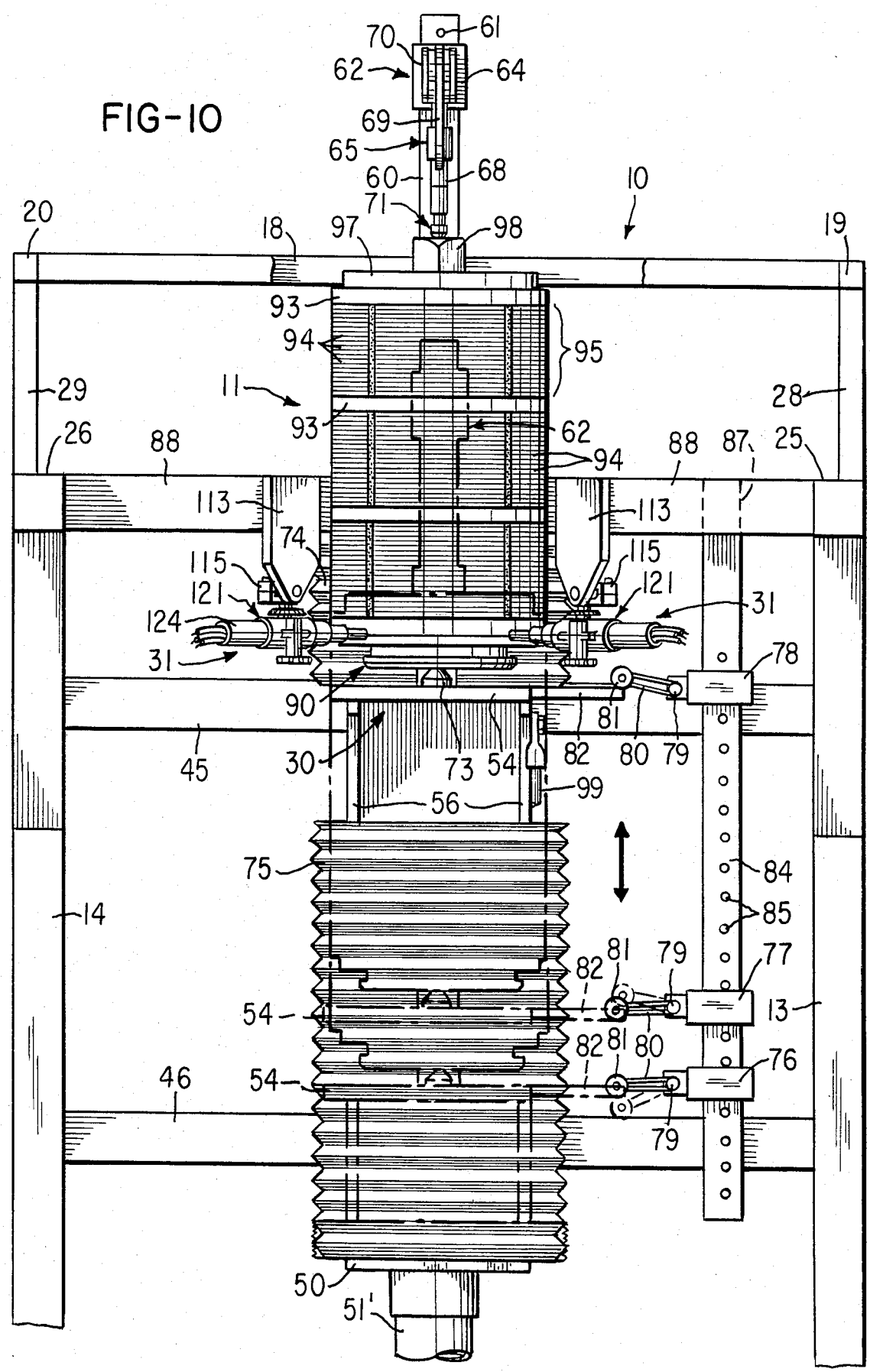
FIG. 10 is a front elevational view of the machine workpiece slide undergoing translatory movement and further depicting limit switch actuation points.

Referring to FIG. 10, the relative positions of the slide assembly 30 and limit switches 76, 77, 78 are shown. The lowermost switch 76 is used to signify the end of cycle and is the position at which the loading and unloading of the workpiece mandrel 90 is performed. The next switch 77 is utilized to start the welding operation as the machine slide assembly 30 traverses upward with an unfinished part. The topmost switch 78 is used to signify the end of the welding operation and to reverse the machine slide assembly movement down to the unload position.

In operation, therefore, the operator inserts a mandrel 90 into the machine 10 and clamps it with the headstock clamp unit 65 while the work slide assembly 30 is in the downmost position whereby the mandrel 90 and thus workpiece 11 are disposed with their common central longitudinal axes coinciding with the previously described mounting axis and such axes and axis are disposed parallel and in spaced side-by-side relation with said slideway defined by bars 52. Referring to FIG. 2, the operator sets the desired WELD SPEED, and places the MODE CYCLE select switch 43 in AUTO. To commence the cycle, the MODE CYCLE switch 43 is rotated to the START position and upward slide movement will occur. The operator then releases the MODE CYCLE switch 43, which returns to the AUTO position as the slide undergoes movement in the vertical direction. The switch dog 83, carried by the machine slide assembly 30, strikes the welding operation start switch 77, and power is provided to the welding guns 31 by the commercial power units 32, 33, of FIG. 1. The commercial TIG-RIG power units are provided with their own "ELECTRO-SLOPE" (TM) control unit which gradually applies the voltage and amperage to the leading edge of the workpiece to initially start the bead formation and thereby prevent breakdown of the corners of the part. As the slide movement continues, the voltage and current is increased to a predetermined level thereby forming the fused bead on the workpiece laminations 94 in a uniform amount. The slide assembly 30 continues in its upward travel until such point as it contacts the uppermost, "end-of-weld", limit switch 78 and a similar deceleration of the weld voltage and current occurs before power is shut off to the welding guns 31 by the commercial units. At the uppermost point, the drive motor 52 reverses its direction, thereby retracting the slide downwardly while the welding guns 31 are turned off. In its downmost movement, the switch dog 83 contacts and over travels the start switch roller, continuing downward until the "down" stop switch 76 is contacted and the cycle is complete.

Figure 11:
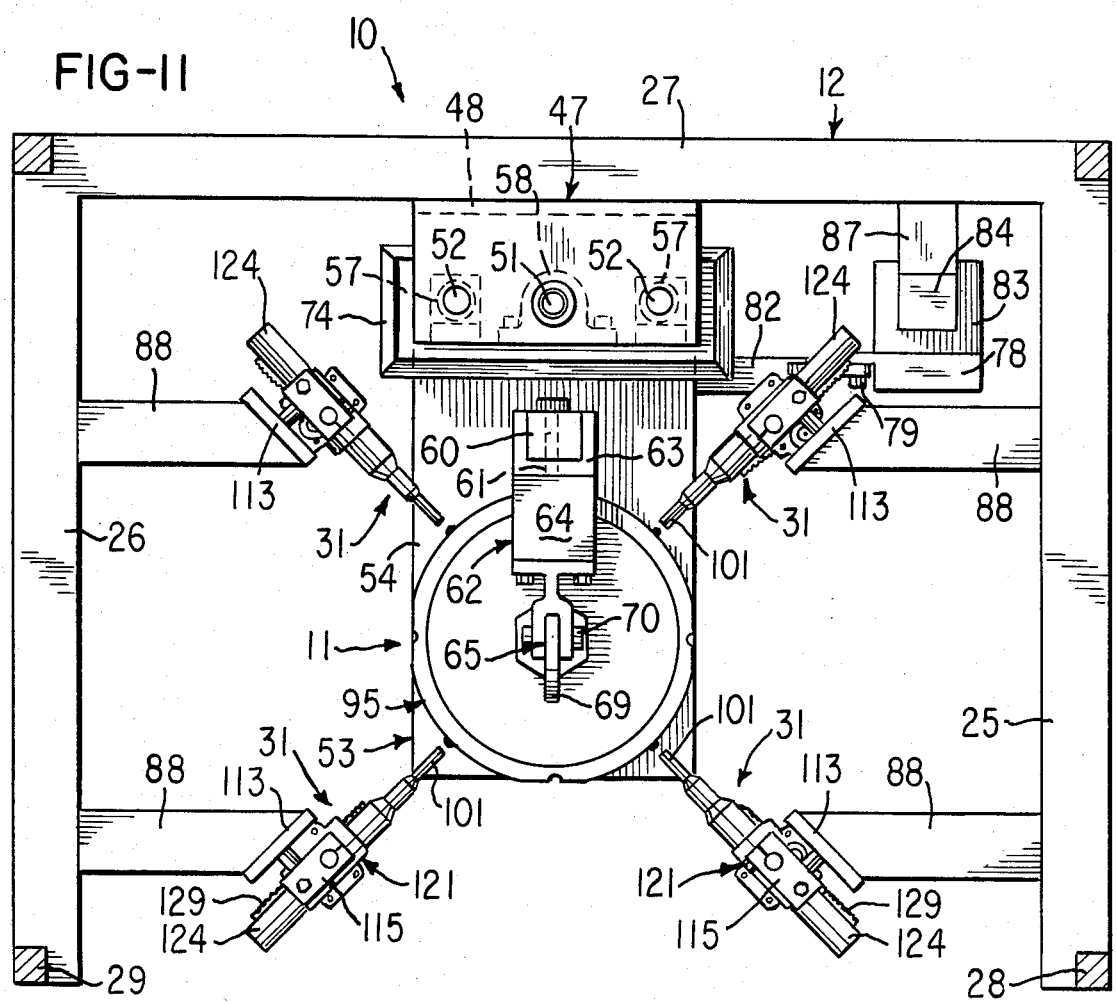
FIG. 11 is a top plan view in partial section showing the machine slide, workpiece, and related torches mounted to the machine frame.

The plan view of FIG. 11 shows the relation of the four welding guns 31 to one another, and to the workpiece assembly 95. The ball screw 51 is shown captivated in the top end plate 49 of the drive screw bracket 48, and is straddled by the slide bars 52 which are likewise captivated in the drive screw bracket 48.

As a first alternate embodiment, it may be appreciated by those skilled in the art that the headstock 62 may be removed from the machine and the footstock 53 can be provided with an expanding arbor workholding chuck with a valve-operated fluid clamp. By such arrangement, production loading of the laminations 94 can be accomplished individually at the machine site rather than on mandrels 90 off the machine 10.

As a second alternate embodiment, those skilled in the art will appreciate that the welding guns 31 are individually set to a fixed radial distance from the part and therefore, a variety of cross-sectional shapes of cores 95 may be welded. For example: square, hexagonal and octagonal cross-sections. Of course, it is seen that the machine 10 is configured for straight-sided parts, but motorized means could be attached to the rod 128 and knob 127 of the gun 31 to radially position the gun barrel 101 in relation to axial movement of the workpiece, therefore permitting the welding of cores and the like.

Figure 12A:
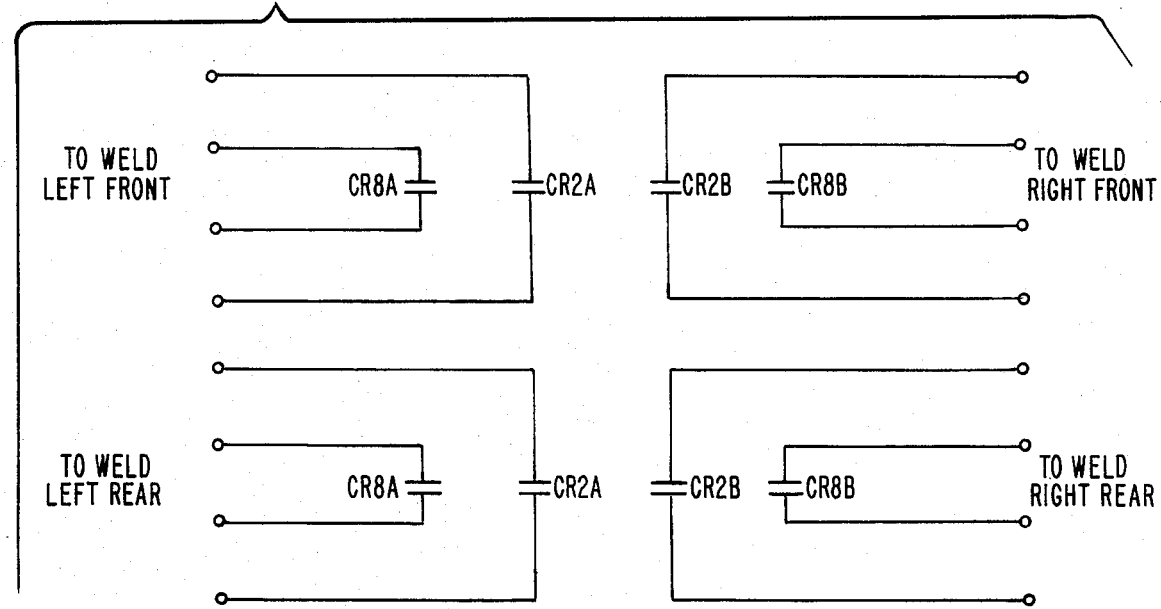
FIG. 12a and FIG. 12b are the electric schematics for the machine.
Figure 12B:
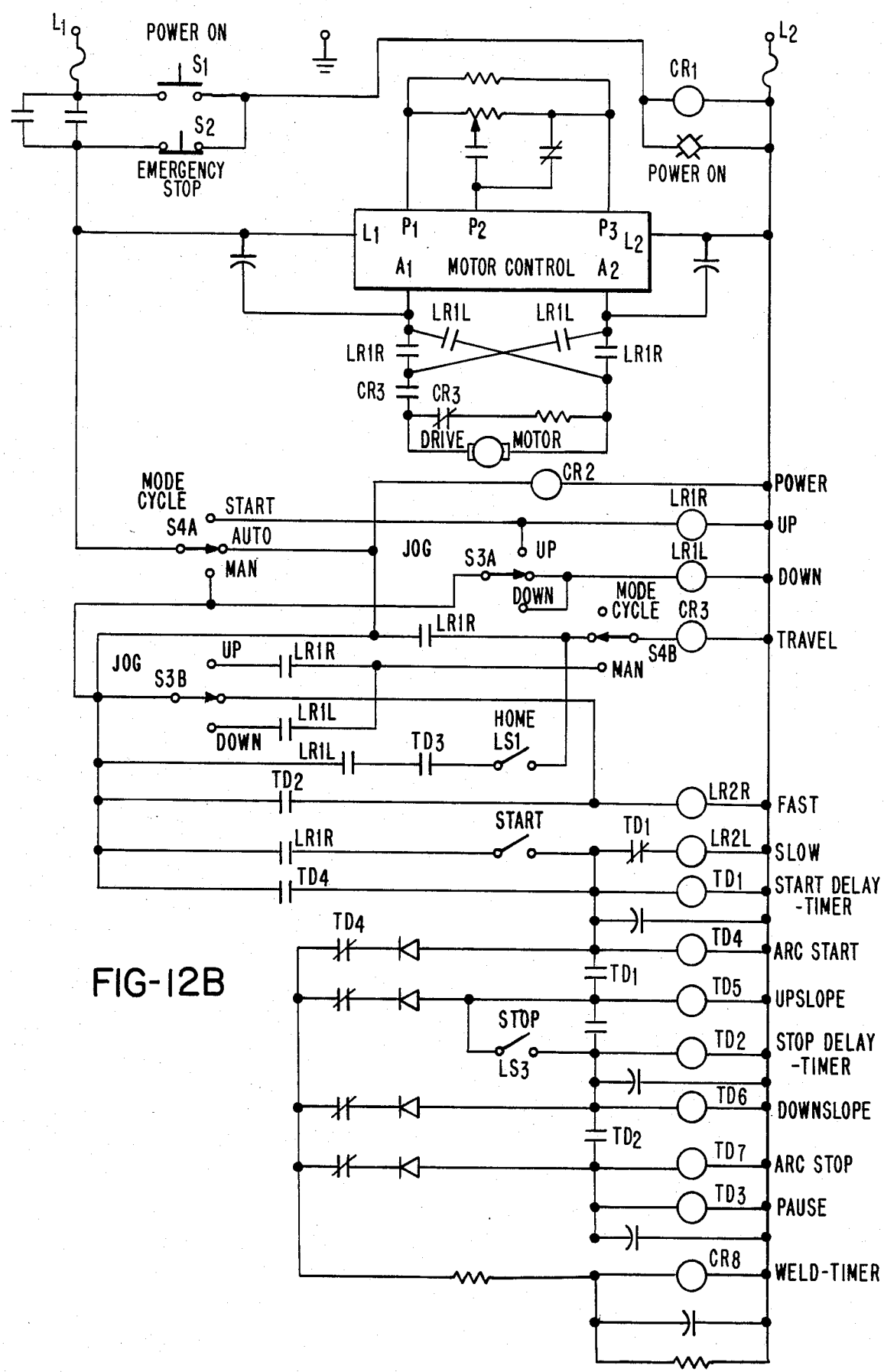

FIGS. 12(a) & (b) depict a ladder wiring diagram for the machine, embodying relay logic. The power lines L1 and L2 carry current at 120 VAC, 60 HZ, 1 PH. In the starting, or "home", position, the slide assembly is in the lowermost position, holding the NO (normally open) contacts of the lower limit switch LS1 "closed". When the POWER ON switch S1 is momentarily closed, control relay CR1 is energized through that switch, lighting the "power on" light and immediately line L1 is maintained through the energized NO contacts of CR1 and the NC (normally closed) EMERGENCY STOP switch, S2. Switch S1 may now be released since the latch circuit through the NO contacts of relay CR1 through the MODE CYCLE switch, S4 A&B (tied together) in the AUTO position, closing the (NO) CR2 contacts in the weld gun circuits of FIG. 12(a).

To manually move the normally de-energized drive motor, the MODE CYCLE switch S4 is moved to the MANUAL position, energizing latching relays LR1L and LR2R through JOG switch S3 A&B (tied together), and closing NO contacts LR1L in the crossover legs of the drive motor circuit and the CR3 line (CR3 contacts remain open).

Next, the JOG switch S3 A&B may be turned, for example, to the "DOWN" position. LR1L is maintained in the energized state. CR3 is energized through the JOG switch S3(B), closing NO contacts CR3 in the drive motor circuit, causing the drive motor to rotate in a first direction. When the JOG switch S3(A) is switched to the UP position, latching relay LR1R is energized, closing the LR1R contacts in the drive motor circuit. Control relay CR3 is energized through contacts LR1R and JOG switch S3(B), thus reversing the direction of the drive motor.

To begin an automatic cycle, the MODE CYCLE switch S4 A&B is first held to the START position and then released to the AUTO position. LR1R is first energized, then as the switch is released to the AUTO position, CR3 is energized through latched contacts LR1R. Closed contacts CR3 and LR1R in the drive motor circuit cause the drive motor to rotate, driving the slide assembly upward. Continuing upward, the slide assembly closes NO limit switch LS2, energizing latching relay LR2L. Time delay relay TD1 is energized (closing contacts TD1), as well as TD4 and TD5, to start the arc welding guns. Control relay CR8 is energized through NC contacts TD4, completing the weld gun circuit in FIG. 12(a). At the top of the slide assembly travel, NO limit switch LS3 is picked up (closed), energizing the STOPDELAY TIME DELAY RELAY, TD2. At this time, the DOWNSCOPE, ARC STOP, and PAUSE time delay relays TD6, TD7, & TD3 are energized to end the weld. The slide assembly may then be manually powered DOWN.

When the EMERGENCY STOP switch S2 is depreesed, at any time, control relay CR1 is de-energized, opening the NO contacts in line L1, halting all machine operation.

Other details of the welding ciruit are omitted as being well-known in the art and commercially available.

While the invention has been shown in conjunction with a specific embodiment, it is not intended to limit the invention to such specific embodiment, but rather the invention extends to all such designs and modifications as come within the scope of the appended claims.

What is claimed is:

1. An automatic welding machine comprising:
(a) a base frame;
(b) a vertical slideway formed on said base frame;
(c) a work slide assembly supported on said slideway for vertical movement therealong, said work slide assembly having a mounting axis for a workpiece disposed parallel to and spaced from said slideway;
(d) antifriction means between said work slide assembly and slideway;
(e) means for supporting said workpiece at opposite ends thereof on said mounting axis of said work slide assembly;
(f) a welding head supported on said base frame at a fixed vertical position along said slideway, said welding head having means for welding said workpiece;
(g) means for maintaining said welding head at a controlled space from said workpiece; and
(h) means for moving said work slide assembly and said workpiece supported thereon along said slideway during simultaneous operation of said welding means to provide weld bead means on said workpiece, said moving means and antifriction means cooperating to provide smooth movement of said workpiece and thereby assure said welding means provides said weld bead means which is uniform.

2. The welding machine of claim 1 wherein said work slide assembly is supported on said slideway in a cantilevered manner, and said means for supporting said workpiece at opposite ends thereof comprises a headstock unit and a foodstock unit disposed in spaced-apart relation on said work slide assembly.

3. The welding machine of claim 2 wherein said workpiece has a central longitudinal axis, said headstock and footstock units have respective machine centers which define said means for supporting said workpiece, said centers serving to locate said workpiece therebetween, and said centers supporting said workpiece with its central longitudinal axis coinciding with said mounting axis.

4. The welding machine of claim 3 wherein one of said machine centers is comprised in part of means for clamping and unclamping said one center, and means for spring-loading said one center against a workpiece.

5. The welding machine of claim 1 wherein said means for moving said work slide assembly comprises a motor-driven screw and ball nut which are axially movable with respect to one another, one of said screw and ball nut is affixed to said slide assembly, and the other of said screw and ball nut is affixed to said base frame, said screw and ball nut cooperating with said antifriction means to assure provision of said uniform weld bead means.

6. The welding machine of claim 1 wherein said means for maintaining said welding head includes a power positioning means.

7. The welding machine of claim 1 wherein said means for maintaining said welding head at a controlled space comprises power means for varying the radial position of said welding head relative to said workpiece as said workpiece is moved in its vertical movement by said work slide assembly.

8. The welding machine of claim 7 and further comprising automatic means for starting said welding means at a predetermined vertical workpiece position, and means for reversing workpiece movement after stopping said welding means.

9. The welding machine of claim 1 wherein said vertical slideway comprises vertical bar means, said antifriction means comprises ball bushing means having recirculating ball bearings, and further comprising at least another welding head also supported on said base frame at a fixed vertical position along said slideway, said other welding head also having means for welding said workpiece.

10. The welding machine of claim 9 and further comprising means for radially positioning said welding heads relative to said workpiece.

11. The welding machine of claim 10 wherein said means for radially positioning comprises power means.

12. An automatic welding machine comprising:
(a) a base frame;
(b) a vertical slideway formed on said base frame;
(c) a work slide assembly supported on said slideway for vertical movement therealong, said work slide assembly having a mounting axis for a workpiece disposed parallel to and spaced from said slideway;
(d) antifriction means between said work slide assembly and slideway;
(e) power chuck means for holding a workpiece in a vertical orientation on said slide assembly;
(f) a welding head supported on said base frame at a fixed vertical position along said slideway, said welding head having means for welding said workpiece;
(g) means for positioning and maintaining said welding head at a controlled space from said workpiece; and
(h) screw drive means for moving said work slide assembly and said workpiece supported thereon during simultaneous operation of said welding means to provide a weld on said workpiece, said screw drive means and antifriction means cooperating to provide smooth movement of said workpiece and thereby assure said welding means provides said weld which is uniform.

13. The welding machine of claim 12 wherein said screw drive means comprises a screw, a ball nut, and an electric motor.

* * * * *